United States Patent
Cocito et al.

(10) Patent No.: US 6,209,356 B1
(45) Date of Patent: Apr. 3, 2001

(54) METHOD OF MAKING POLARIZATION-MAINTAINING OPTICAL FIBERS

(75) Inventors: Giuseppe Cocito, S. Giusto Canavese; Giorgio Grego, S. Francesco al Campo, both of (IT)

(73) Assignee: Agilent Technologies, Inc., Palo Alto, CA (US)

( * ) Notice: Subject to any disclaimer, the term of this patent is extended or adjusted under 35 U.S.C. 154(b) by 615 days.

(21) Appl. No.: 08/975,338

(22) Filed: Nov. 20, 1997

Related U.S. Application Data

(63) Continuation of application No. 08/597,838, filed on Feb. 7, 1996, now abandoned.

(30) Foreign Application Priority Data

Feb. 23, 1995 (IT) ............................................. T095A0129

(51) Int. Cl.$^7$ ............................................... C03B 37/027
(52) U.S. Cl. ........................... 65/392; 65/425; 250/492.1
(58) Field of Search .................... 65/392, 425; 250/492.1

(56) References Cited

U.S. PATENT DOCUMENTS

| | | | |
|---|---|---|---|
| 4,157,253 | * 6/1979 | Hernqvist | 65/425 |
| 4,770,898 | * 9/1988 | Sugai | 65/425 |
| 5,400,422 | * 3/1995 | Askins | 385/37 |
| 5,478,371 | * 12/1995 | Lemaire | 65/392 |
| 5,559,907 | * 9/1996 | Inniss | 65/425 |

FOREIGN PATENT DOCUMENTS

| | | | |
|---|---|---|---|
| 45345 | * 2/1982 | (EP) | 65/425 |
| 0 045 345 | 10/1982 | (EP) . | |
| 0 604 039 | 6/1994 | (EP) . | |
| 60-204641 | 10/1985 | (JP) . | |
| WO 94 19713 | 9/1994 | (WO) . | |

\* cited by examiner

*Primary Examiner*—John Hoffmann
(74) *Attorney, Agent, or Firm*—Herbert Dubno

(57) ABSTRACT

To manufacture polarization-maintaining optical fibers, a fiber is directly and continuously irradiated with at least one beam of UV radiation during drawing and before application of external coatings.

2 Claims, 2 Drawing Sheets

METHOD OF MAKING POLARIZATION-MAINTAINING OPTICAL FIBERS

CROSS REFERENCE TO RELATED APPLICATION

This is a file wrapper continuation of applicaton Ser. No. 08/597,838 filed Feb. 7, 1996 abandoned.

FIELD OF THE INVENTION

The present invention described herein relates to physical carriers for optical communications and, in particular, to a method for the fabrication of monomode polarization-maintaining optical fibers.

BACKGROUND OF THE INVENTION

In many applications of monomode optical fibers— including coherent communication systems,—it is important for the optical signal which propagates along a fiber to maintain its polarization characteristics constant and stable also with respect to a reference rigidly connected to the fibre. A way to obtain this condition is to use, as a transmission medium, a so-called polarization-maintaining fiber.

A polarization-maintaining fiber is essentially a birefringent element, i.e. an element with different refractive indices in two directions orthogonal with respect to each other and to the axis of the fibre. In the production of these fibers, in particular for use in telecommunications, two techniques are generally employed to obtained birefringence in a naturally isotropic material, such as glass. The first technique involves the production of fibers whose cores do not have axial symmetry, e.g. is elliptical or rectangular or is associated with external elements which alter the distribution of the guided electromagnetic field. The second technique involves the fabrication of fibers whose cores are kept in a condition of transverse mechanical stress.

The main drawback of these techniques is that they require dedicated manufacturing processes, which cannot be used to manufacture conventional fibers. It would, instead, be desirable to use a technique allowing induction of birefringence in the course of a manufacturing process which can also be used for conventional fibers.

The paper "Single Pulse Bragg Gratings Written during Fiber Drawing" by L. Dong et al., Electronics Letters, Aug. 19, 1993, Vol. 29, No. 17, pp. 1577–1578, describes a method of fabricating gratings with periodic variation of the refractive index inside the core of a fiber, while the fiber is being drawn. The method produces refractive index alterations in the germania doped silica, utilizing a UV beam, of such energy as to break the Ge—Ge bridges present inside the doped silica matrix. In particular, according to the cited paper, the fiber is irradiated, in an area immediately upstream of the devices applying the coating, with a wave front resulting from the interference of two parts of a same pulse which have been sent along the two branches of an interferometer and which recombine at the core of the fiber. A periodic modulation of the refractive index of the core is thus obtained, which brings about the periodic variation in reflectivity necessary to fabricate a grating. Instead of the interferometer, a phase mask can be used, as described for instance by K. O. Hill et al. in "Bragg gratings fabricated in monomode photosensitive optical fiber by UV exposure through a phase mask", Applied Physics Letters, Vol. 62, No. 10, Mar. 8, 1993.

Although the method described in the paper by L. Dong is oriented to the fabrication of a sequence of discrete components, the same technique could be used, in theory, to realise a grating distributed along a whole fiber, which would thus be a polarization-maintaining fiber, since the profile of the refractive index is different along different axes of a given section of the fiber.

However, such a solution is difficult to realise in practice. Since the grating is "written" into the fiber in a sequence of steps, the grating could present discontinuities. Moreover, the fabrication of a grating presents problems as to the correct alignment of the means which bring about the modulation, especially if it is desired to alter the profile of the refractive index of the original matrix according to multiple, different axes. Furthermore, a grating is an intrinsically wavelength-selective structure, which limits the flexibility of employment of the fibers thus obtained.

SUMMARY OF THE INVENTION

According to the invention, a method is instead provided which allows production of the desired profile, even according to multiple axes, and to obtain non-selective structures.

This is obtained in that the beam irradiates the fiber directly and continuously, and the beam is sent towards the fiber with such an aperture that, by the effect of the refractive index variations at the interface between the outside environment and the cladding of the fiber and between the cladding and the core, the beam going through the core is a collimated beam.

BRIEF DESCRIPTION OF THE DRAWING

The invention shall be better understood from the following description, with reference to the enclosed drawing, where.

SPECIFIC DESCRIPTION

Figure 1:
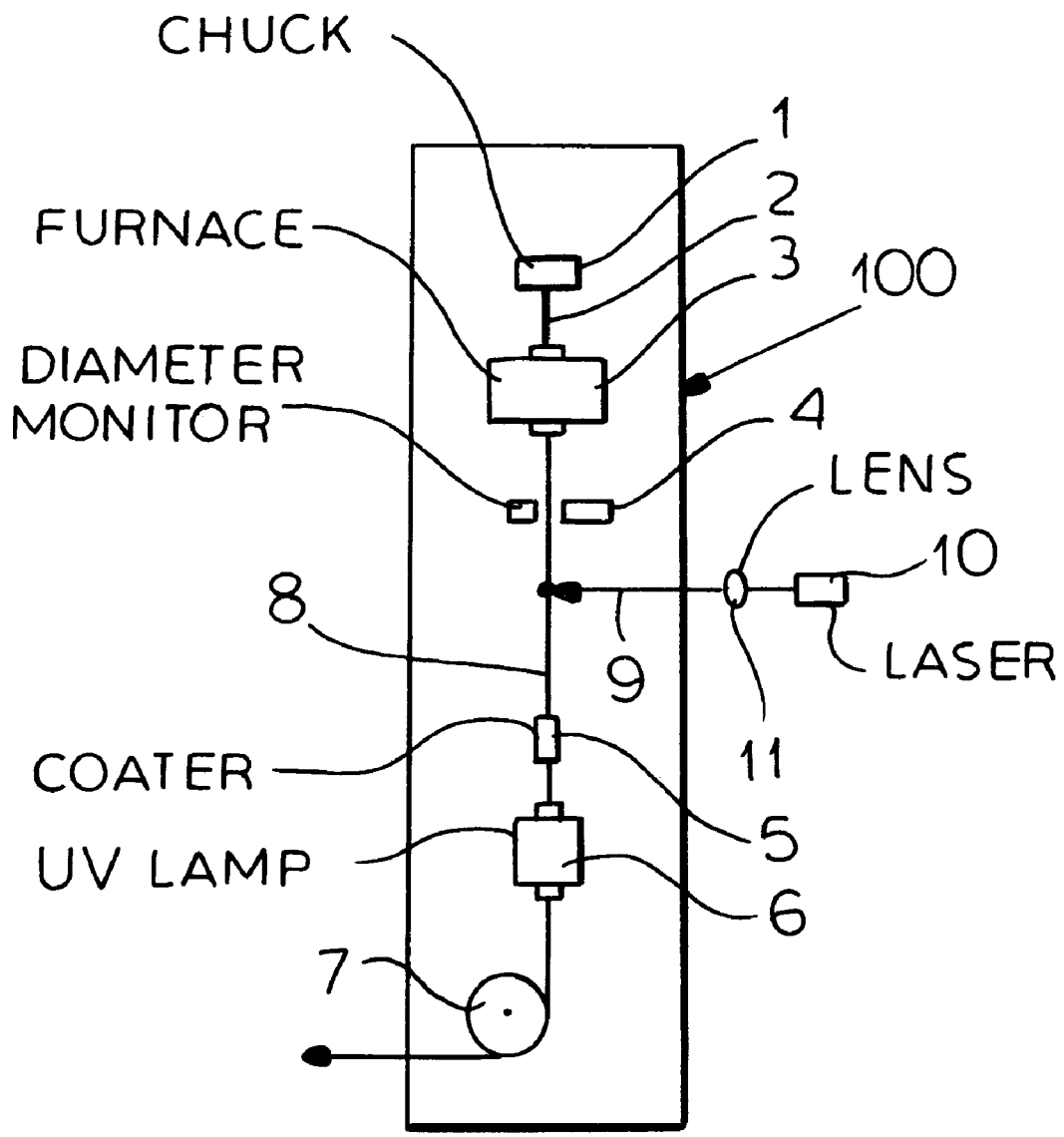
FIG. 1 is a schematic representation of an optical fiber drawing apparatus, to which the invention is applied.
Figure 2:
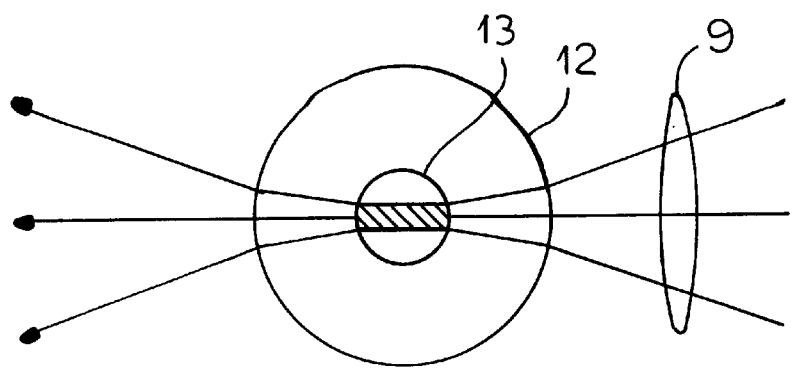
FIGS. 2 and 3 are schematic representations, in enlarged scale, of the irradiated area of the fiber.

FIG. 1 shows a conventional drawing tower for optical fibers, indicated as a whole by 100, comprising a chuck 1 supporting preform 2, a furnace 3, means 4 for monitoring the diameter of fiber 8 being drawn, a coating cup 5 to apply the external polymeric coating to the fiber, coating curing UV lamp 6, and take-up capstan 7 for drawing fiber 8. Before reaching the coating cup, the fiber is irradiated continuously and directly with a UV radiation beam 9 emitted by a source 10, e.g. a KrF excimer laser, with emission wavelength $\lambda=248$ nm. The UV beam is sent towards the fiber by means of a suitable optical system, represented schematically by lens 11. The optical system makes beam 9 arrive on the surface of fiber 8 with such an aperture that, taking into account the refractive index steps at the interfaces between air and fiber cladding 12 and between cladding 12 and core 13, the beam is essentially collimated in correspondence with the core 13, as shown in FIG. 2, i.e. is an essentially parallel beam where it passes through the core.

Irradiation with a UV beam, as stated above, causes an increase in the refractive index of the silica glass along the axis corresponding with the direction of propagation of the beam, to an extent linked to the power of the beam and to the characteristics of the matrix. For example, in the case of a $SiO_2$—$GeO_2$ matrix, an increase in refractive index equal to $3 \cdot 10^{-4}$ can be obtained by irradiating with a source whose power is 300 mJ/cm$^2$. Consequently, the irradiated core behaves like a core having different dimensions along two perpendicular axes and therefore the fiber is actually a polarization-maintaining fiber.

Figure 3:
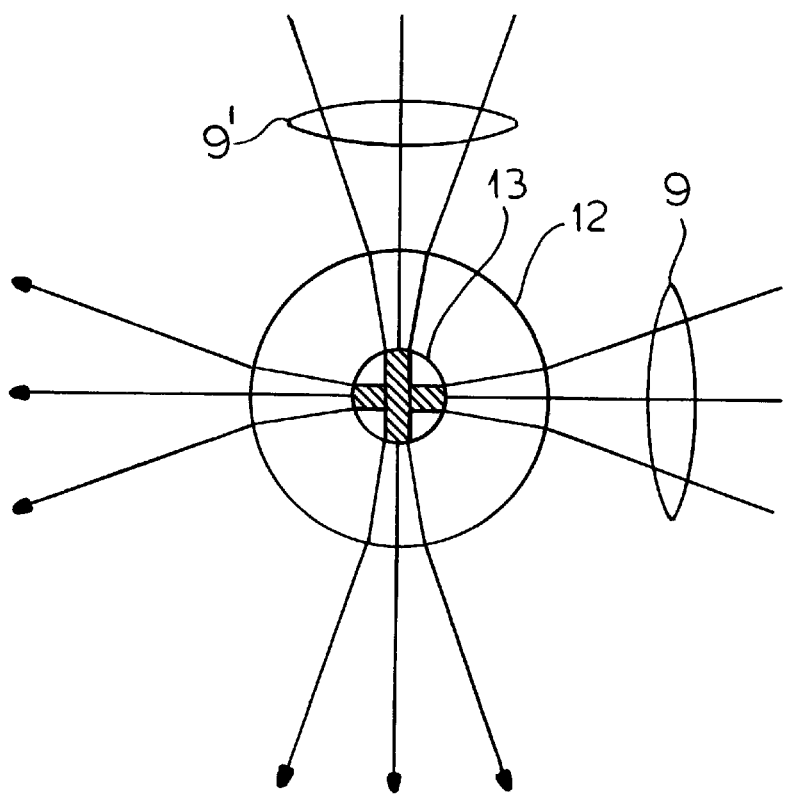

Obviously, the fiber can be irradiated with multiple beams sent along different directions (e.g. two beams 9, 9' crossing the core in perpendicular directions, as shown in FIG. 3) and with different powers, in order to maintain asymmetry in the refractive index profile in different directions. Thanks to direct irradiation, the alignment between the different beams presents no problems.

What is claimed is:

1. A method of fabricating a polarization-maintaining silica optical fiber, comprising the steps of:
   (a) heating a silica preform;
   (b) drawing a silica optical fiber from said preform to form a core and a cladding on said core as part of the drawn silica optical fiber and so that said cladding has an external surface forming an interface with an external environment;
   (c) downstream of the drawing of the silica optical fiber from the preform, coating said silica optical fiber; and
   (d) while said optical fiber is being drawn, directly and continuously transversely irradiating said optical fiber with at least one beam of ultraviolet radiation, said at least one beam of ultraviolet radiation being directed at the optical fiber such that said beam is collimated in passing through said core because of differences in refractive index between said core and said cladding and at said interface.

2. The method defined in claim 1 wherein said optical fiber is irradiated in step (d) with at least one further ultraviolet beam having a different power from said at last one beam and incident upon said optical fiber from a different direction from said at least one beam to be collimated in passing through said core.

* * * * *